Patented Aug. 12, 1941

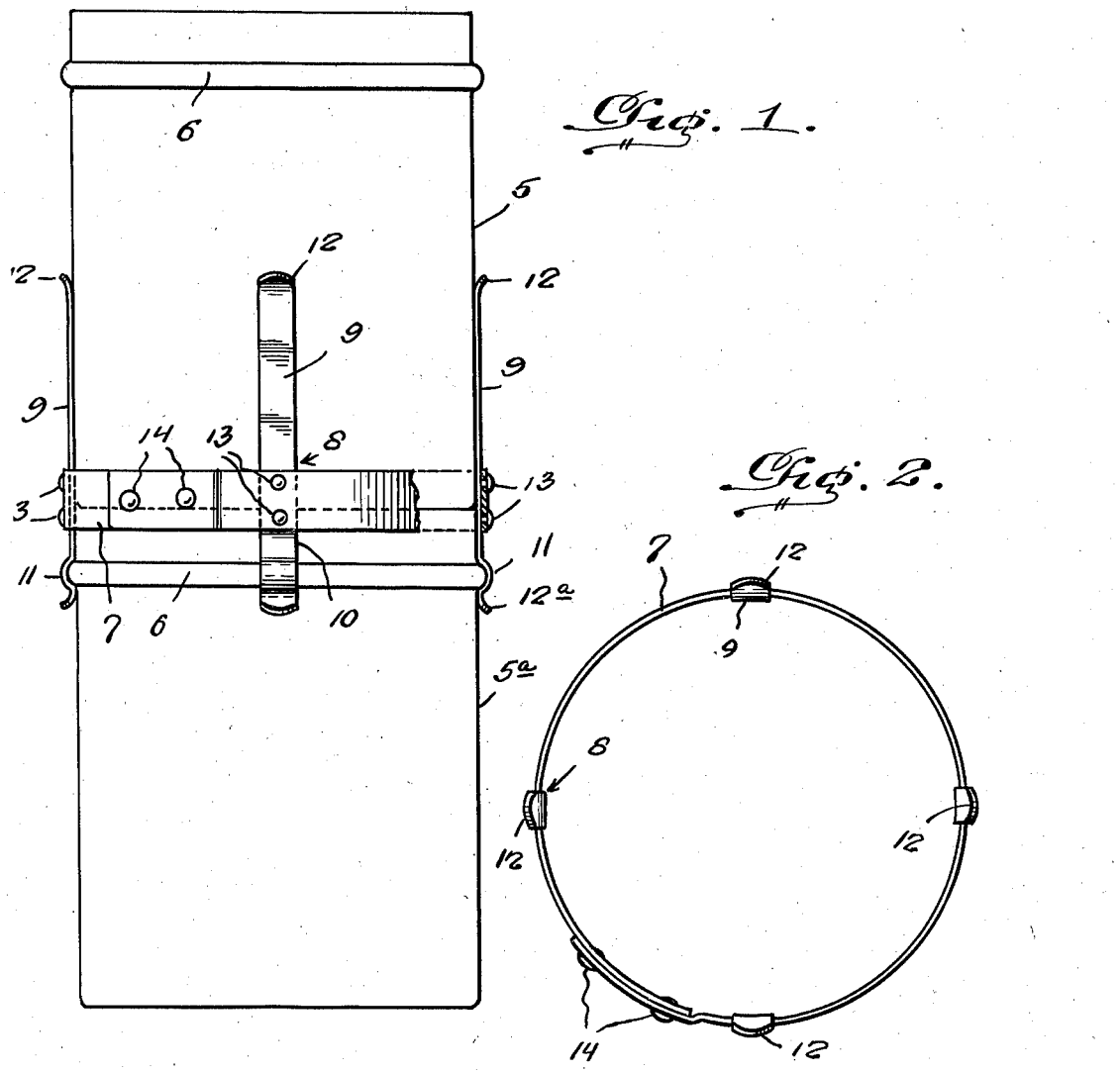

2,252,272

UNITED STATES PATENT OFFICE 2,252,272

ICE CREAM CAN HOLDER

Homer N. Otto, Rialto, Calif.

Application May 28, 1940, Serial No. 337,707

2 Claims. (Cl. 220—97)

This invention relates to an ice cream can holder, and has more particular reference to a device for preventing an ice cream can from readily turning relative to or sliding off of another similar can when superimposed upon the latter.

There has been considerable difficulty in recent years amongst persons dispensing ice cream, due to the fact that the ice cream has been packed in two and one-half gallon cans instead of in five gallon cans. The reason for this change is the development of the modern mechanical ice cream cooler having compartments, each adapted to receive two of the two and one-half gallon cans of ice cream, placed one on top of the other. The difficulty mentioned is due to the fact that when the ice cream is endeavored to be taken from the upper can, the latter has a tendency to turn and slide off the bottom can, especially when the ice cream is frozen very hard.

There is a very dire need, therefore, of a device that will prevent this difficulty, and the present invention has been found entirely satisfactory for this purpose in actual practice.

The present invention consists in the novel form, combination and arrangement of parts hereinafter more fully described, shown in the accompanying drawing, and claimed.

In the drawing:

Figure 1 is an elevational view of a can holder applied to superimposed ice cream cans and constructed in accordance with the present invention, the holder being partly broken away and in section; and Figure 2 is a top plan view of the can holder per se.

Referring in detail to the drawing, 5 and 5a indicate conventional two and one-half gallon ice cream cans placed one upon the other as is practiced when the cans are placed in the compartment of a cooler for dispensing the ice cream from the uppermost can. Each can comprises a cylindrical body provided near the top with an outwardly pressed annular bead 6.

The present invention is designed for application to the superimposed cans 5 and 5a so as to prevent ready turning of the upper can 5 relative to the lower can 5a, and to prevent sliding of the upper can 5 off of the lower can 5a when ice cream is dispensed from the upper can 5. The device consists of a circular metal band 7 of a diameter to snugly encircle the adjacent end portions of the superimposed cans, and carried by this band 7 at regular spaced intervals are vertical strips of spring metal 8 having longer upper end portions 9 tensioned to spring inwardly and frictionally engage the upper can 5 for a considerable portion of its height. The strips 8 also have relatively shorter lower end portions 10 which are curved outwardly as at 11 to embrace the bead 6 of the lower can 5a. The terminals of the strips 8 are outturned as at 12 and 12a to facilitate engagement of the device over the lower can and its bead 6 and to facilitate insertion of the upper can 5 within the upper end portions 9 of the strips 8. The strips 8 are rigidly fastened to the band 7 so as to intersect the latter at right angles thereto, by means of rivets 13 or the like.

In practice, the band 7 is preferably formed of a strip of spring metal having holes punched in the ends thereof so that when the strip is shaped in circular form with the ends thereof overlapped, the holes may be alined for reception of rivets 14 so as to form the band. Thus, the device may be shipped in flat form with the ends of the strip forming band 7 unconnected but adapted to be riveted together in overlapped relation by the user.

In practice, the device is pressed onto the upper end of the lower can 5a so that the shorter lower end portions 10 of the strips 8 snap over the bead 6 of said lower can. The upper can 5 is then inserted within the longer upper end portions 9 of the strips 8, the adjacent upper end portion of can 5a and lower end portion of can 5 being encircled by the band 7. Due to the snug fit of the band 7 about the adjacent ends of the cans, the upper can is effectively held against sliding off of the lower can. By reason of the engagement of the lower ends 10 of the strips 8 over the bead 6 of the lower can, upward displacement of the upper can 5 relative to the lower can is effectively prevented, and ready turning of the upper can 5 relative to the lower can 5a is prevented due to the frictional engagement of the upper and lower end portions of the strips 8 with the two cans, said end portions of the strips being tensioned to spring inwardly into frictional engagement with the cans as explained above. It will be seen that the device is extremely simple and economical to manufacture as well as highly efficient in use. The invention and its advantages will be readily understood and appreciated by those skilled in the art, and minor changes in form, construction and arrangement of parts may be made without departing from the spirit and scope of the invention.

What I claim as new is:

1. A device for holding ice cream cans in superimposed relation and against ready relative turning, comprising a band of a size to snugly encircle adjacent ends of the cans, and vertical strips rigidly secured to the band at regular intervals and having upper and lower end portions tensioned to spring inwardly and frictionally engage the respective cans, said strips having relatively short lower end portions curved outwardly to snap over an exterior annular bead provided on and near the top of the lower can, the upper end portions of said strips being relatively longer, the end portions of the strips being tensioned to spring inwardly and frictionally engage the respective cans.

2. In a device of the character described, an elongated strip adapted to be shaped into a band and having holes in the ends thereof adapted to be registered when the strip is so shaped for reception of rivets for securing the ends together and forming such band, and strips of spring metal rigidly fastened to the strip at regular spaced intervals and tensioned to spring inwardly when the strip is formed into a band for frictional engagement with the respective ones of superimposed ice cream cans, said strips having relatively longer upper end portions and relatively shorter lower end portions, said shorter lower end portions being curved outwardly to snap over an exterior annular bead provided on and near the top of the lower can.

HOMER N. OTTO.